Patented July 11, 1950

2,514,624

UNITED STATES PATENT OFFICE 2,514,624

COPOLYMERS OF ACRYLONITRILE AND ISOPROPENYL ACETATE

John R. Caldwell, Kingsport, Tenn., assignor to Eastman Kodak Company, Rochester, N. Y., a corporation of New Jersey No Drawing. Application May 7, 1948, Serial No. 25,797

9 Claims. (Cl. 260—85.5)

This invention relates to new resinous copolymers and to a process for preparing them. More particularly, this invention relates to copolymers of acrylonitrile and isopropenyl acetate.

It is known that unsaturated, polymerizable vinyl-type compounds, e. g. vinyl esters, such as vinyl acetate, can be interpolymerized with acrylonitrile to give resinous copolymers useful in preparing films, fibers, molded articles, etc. The limitations on such copolymers are many, however, and their use has been somewhat restricted.

I have now found that isopropenyl acetate (1-propen-2-ol acetate) which can neither be polymerized alone to give a high molecular weight polymer, nor contains a vinyl group, can be interpolymerized with acrylonitrile to give resinous products which are excellently suited for conversion into fibers, sheets, tapes, films, and molded objects. Unlike vinyl acetate, isopropenyl acetate does not form copolymers with certain unsaturated, polymerizable compounds, such as esters of mesaconic or citraconic acids, and hence it was unexpected to find that isopropenyl acetate readily forms copolymers with acrylonitrile.

It is, therefore, an object of my invention to provide new resinous copolymers. A further object is to provide a process for preparing such resinous copolymers. A still further object is to provide films, sheets, fibers and molded objects of such resinous copolymers and a process for preparing such films, sheets, fibers and molded objects. Other objects will become apparent from a consideration of the following description.

In accordance with the process of my invention, I interpolymerize isopropenyl acetate with acrylonitrile. The isopropenyl acetate used in practicing the process of my invention can conveniently be prepared by the condensation of acetone with ketene in the presence of sulfuric acid as a catalyst. Such a process is described by Gwynn and Degering, "Jour. Am. Chem. Soc." Vol. 64 (1942), page 2216.

The interpolymerization of isopropenyl acetate with acrylonitrile can be accelerated by heat, or by polymerization catalysts which are known to accelerate the polymerization of vinyl-type compounds. Such catalysts include, for example, the organic peroxides (e. g. benzoyl peroxide, acetyl peroxide, acetyl benzoyl peroxide, lauroyl peroxide, etc.), hydrogen peroxide, perborates (e. g. alkali metal perborates, such as those of sodium and potassium) and persulfates (e. g. alkali metal persulfates, such as those of sodium and potassium). The quantity of catalyst used can be varied, depending on the temperature, and presence or absence of solvents, however, I have found that from 0.01% to 2% by weight, based on the total weight of isopropenyl acetate and acrylonitrile, of catalyst is usually sufficient for the purposes of my invention.

The temperatures at which the process of my invention can be carried out can vary from ordinary room temperature to the reflux temperature of the reaction mixture. Generally a temperature of from 25° to 75° C. is sufficient.

Advantageously, the interpolymerization can be effected with or without a diluent. The diluent, if employed, is conveniently a solvent for the copolymer. The monomers can also be emulsified in a liquid in which they are insoluble (e. g. water), with or without the aid of emulsifying agents, and the emulsion subjected to polymerization. Typical emulsifying agents include the alkali metal salts of fatty alcohol sulfates (e. g. sodium lauryl sulfate); alkali metal salts of aromatic sulfonic acids; sulfo-succinic acid esters, their alkali metal salts or amine addition salts; alkali metal salts of fatty acids containing from 12 to 20 carbon atoms; and sulfonated fatty acid amides, or their alkali metal salts. In general, any of the known emulsifying agents can be used. Polymers having excellent solubility properties can be obtained by dissolving the monomers in a 30 to 40% aqueous solution of sodium toluene sulfonate, sodium xylene sulfonate or sodium cumene sulfonate.

The polymerization can also be carried out by the bead or pearl polymerization, in which the monomers are dispersed in a medium in which they are insoluble (e. g. water), and the dispersion polymerized with or without the aid of weak dispersing agents, such as gum arabic, gelatin, methylated starch, polyvinyl alcohol, etc. The polymerization is advantageously effected in a container, filled to about three-fourths capacity, which is tumbled end over end until the polymerization is complete.

Chain regulators, such as hexyl, octyl, lauryl, dodecyl or myristyl mercaptans, etc., which impart improved solubility properties to the copolymers can be used if desired.

The copolymers obtained in practicing the process of my invention are soluble in a variety of organic solvents, depending primarily on the ratio of isopropenyl acetate to acrylonitrile in the copolymer. The higher the percentage of acrylonitrile in the copolymer, the less soluble the copolymer becomes in the well-known organic solvents, such as acetone, benzene, toluene, etc.

Polymers containing more than about 85% acrylonitrile can be dissolved in highly polar solvents, such as dimethylformamide, N,N-dimethylmethoxyacetamide, malonitrile, succinonitrile, ethylene cyanohydrin (acetaldehyde cyanohydrin), etc. Polymers containing from 60 to 85% acrylonitrile can be dissolved in solvents, such as acetonitrile, gamma-valerolactone, or a mixture of 2 parts of acetonitrile to one part of dimethylformamide. Polymers containing less than 60% acrylonitrile can be dissolved in many of the common organic solvents (e. g. acetone).

Although the ratio of isopropenyl acetate to acrylonitrile can be varied over a relatively wide range, I have found that most useful results are obtained by interpolymerizing a monomeric mixture consisting of from 5 to 55% by weight of isopropenyl acetate and from 45 to 95% by weight of acrylonitrile. This range of monomers gives a polymer containing from 5 to 45% by weight of isopropenyl acetate and from 55 to 95% by weight of acrylonitrile in the polymer molecule. While the polymer appears to have a composition corresponding closely to that of the monomeric mixture prior to polymerization where the acrylonitrile content in the monomeric mixture is rather high, such does not seem to be the case where the isopropenyl acetate content in the monomeric mixture approaches that of acrylonitrile.

The following examples will serve to illustrate further the manner whereby I practice the process of my invention.

Example I 40 gms. of acrylonitrile and 20 gms. of isopropenyl acetate were added to 180 cc. of distilled water in a glass bottle. To this mixture 0.1 gm. of potassium persulfate, 0.1 gm. of dodecyl mercaptan, 0.5 gm. of the sodium salt of dioctyl sulfosuccinate and 0.8 gm. of the sodium salt of sulfonated high molecular weight ether were added. The mixture was then tumbled end over end at a temperature of 50° C. for 36 to 48 hours. The resulting emulsion containing the polymer was broken by the addition of a small amount of sodium sulfate, and the coagulated resin was washed with water. After drying the polymer in a hot air oven, a yield of 35 to 40 gms. of resinous polymer was obtained. On analysis the resin was found to contain 76% by weight of acrylonitrile and 24% by weight of isopropenyl acetate. The resin was found to be soluble in hot acetonitrile, and films coated from the viscous solution so obtained were clear, tough and flexible.

Example II 10 gms. of isopropenyl acetate and 10 gms. of acrylonitrile were dissolved in 75 cc. of a 30% aqueous solution of sodium cumene sulfonate. Potassium persulfate (0.1 gm.) was added to the solution, and the mixture was allowed to stand for 48 hours at 50° C. The resulting precipitate was separated out and washed with distilled water. After drying in a hot air oven, 8 gms. of a copolymer of isopropenyl acetate and acrylonitrile were obtained as a fine powder. On analysis the resin was found to have a nitrogen content of 15.2%, corresponding to a composition of 43% by weight of isopropenyl acetate and 57% by weight of acrylonitrile in the copolymer.

Example III 45 gms. of acrylonitrile, 15 gms. of isopropenyl acetate and 0.1 gm. of potassium persulfate were dispersed in 200 cc. of water, and a mixture consisting of 1 gm. of sulfonated mineral oil, 0.5 gm. of the sodium salt of dioctyl sulfosuccinate and 0.1 gm. of dodecyl mercaptan was added. This mixture was tumbled end over end in a bottle for 48 hours at 50° C. The reaction mixture remained as a stable emulsion, and this emulsion was broken by the addition of a small amount of sodium sulfate. The coagulated resin was separated from the aqueous residue and washed with distilled water. After drying in a hot air oven, a yield of 50 gms. of resinous copolymer was obtained. On analysis the resin was found to have nitrogen content of 20.1%, which corresponded to a composition of 24% by weight of isopropenyl acetate and 76% by weight of acrylonitrile in the copolymer. This copolymer was soluble in gamma-valerolactone, a mixture of two parts acetonitrile and one part gamma-valerolactone or a mixture of two parts acetonitrile and one part dimethylformamide. Fims cast from the viscous solutions of the copolymer in these solvents were clear, tough and flexible.

The resin obtained in the above example was found to be an especially useful material for the preparation of valuable, synthetic fibers. The following method was used to obtain these fibers:

10 gms. of the resin obtained in Example III were dissolved in a mixture of 40 gms. of acetonitrile and 20 gms. of dimethylformamide. The resulting viscous solution was placed in a container, under an atmosphere of nitrogen, which was equipped with a spinnerette at one end. Pressure was applied to the container by the addition of more nitrogen gas, and the viscous solution was extruded through the spinnerette into a water bath heated to 25° C. where it coagulated into fine, lustrous filaments. After passing through the 40-inch length of the water bath, the filaments were passed through a hot air drafting chamber, where they were stretched, or drafted, 400% by passing over rollers of varying diameters and revolving at different speeds. After applying a slight twist to the filaments to make a single fiber, the fiber was wound on a drum or winder. The fiber showed a tensile strength of from 3.2 to 3.5 grams per denier on test, and gave an elongation of 12 to 15%. It had an excellent elastic recovery and softened only at temperatures above 180° C. The fiber was readily dyed by most of the dyes commonly used on cellulose acetate yarn.

Example IV 60 gms. of acrylonitrile, 7 gms. of isopropenyl acetate and 0.1 gm. of potassium persulfate were dispersed in 250 cc. of distilled water, and a mixture consisting of 1.2 gms. of sulfonated mineral oil, 0.6 gm. of the sodium salt of a sulfated alcohol containing 16 carbon atoms and 0.15 gm. of dodecyl mercaptan was added. The mixture was then tumbled end over end in a glass bottle for 30 hours at 55° C. The resulting stable emulsion was broken by the addition of a small amount of sodium sulfate. The coagulated resin was washed with distilled water and dried in a hot air oven to give 55 to 60 gms. of resin. On analysis the polymer was found to have a composition corresponding to 10% isopropenyl acetate and 90% acrylonitrile. It was soluble either in dimethylformamide or ethylene cyanohydrin, and fibers spun from viscous solutions of the copolymer in these solvents were strong and elastic.

Operating in a similar manner, other copolymers of isopropenyl acetate and acrylonitrile can be prepared which are useful in the manufacture of films, sheets, tapes and molded objects. If desired, mixtures of isopropenyl acetate and acrylonitrile can be incompletely polymerized to give viscous, resinous masses which are excellently suited for impregnating textiles, sizing paper, etc.

What I claim as my invention and desire secured by Letters Patent of the United States is:

1. A resinous copolymer of isopropenyl acetate and acrylonitrile containing from 5 to 45% by weight of isopropenyl acetate and from 55 to 95% by weight of acrylonitrile in the polymer molecule.

2. A resinous copolymer of isopropenyl acetate and acrylonitrile containing 43% by weight of isopropenyl acetate and 57% by weight of acrylonitrile in the polymer molecule.

3. A resinous copolymer of isopropenyl acetate and acrylonitrile containing 24% by weight of isopropenyl acetate and 76% by weight of acrylonitrile in the polymer molecule.

4. A resinous copolymer of isopropenyl acetate and acrylonitrile containing 10% by weight of isopropenyl acetate and 90% by weight of acrylonitrile in the polymer molecule.

5. A process for preparing a resinous copolymer comprising heating, in the presence of a peroxide polymerization catalyst, a mixture consisting of from 5 to 55% by weight of isopropenyl acetate and from 45 to 95% by weight of acrylonitrile.

6. A process for preparing a resinous copolymer comprising heating, in the presence of an inorganic peroxide polymerization catalyst, a mixture consisting of from 5 to 55% by weight of isopropenyl acetate and from 45 to 95% by weight of acrylonitrile.

7. A process for preparing a resinous copolymer comprising heating, in the presence of an inorganic peroxide polymerization catalyst, a mixture consisting of 50% by weight of isopropenyl acetate and 50% by weight of acrylonitrile.

8. A process for preparing a resinous copolymer comprising heating, in the presence of an inorganic peroxide polymerization catalyst, a mixture consisting of 25% by weight of isopropenyl acetate and 75% by weight of acrylonitrile.

9. A process for preparing a resinous copolymer comprising heating, in the presence of an inorganic peroxide polymerization catalyst, a mixture consisting of 10% by weight of isopropenyl acetate and 90% by weight of acrylonitrile.

JOHN R. CALDWELL.

REFERENCES CITED

The following references are of record in the file of this patent:

UNITED STATES PATENTS

| Number | Name | Date |
|---|---|---|
| 2,140,048 | Finkentscher et al. | Dec. 13, 1938 |
| 2,448,531 | Kenyon et al. | Sept. 7, 1948 |
| 2,452,165 | Unruh et al. | Oct. 26, 1948 |